United States Patent
Kim et al.

(10) Patent No.: US 11,714,490 B2
(45) Date of Patent: Aug. 1, 2023

(54) RADIAL MAGNET ACTUATOR WITH MOVING MASS HAVING A MAGNET MOVING VERTICALLY AND A COIL

(71) Applicant: CK MATERIALS LAB CO., LTD., Seoul (KR)

(72) Inventors: Hyeong Jun Kim, Seoul (KR); Jong Hun Lee, Seoul (KR); Jong Ki Lee, Seoul (KR); Ihn Beom Lee, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 212 days.

(21) Appl. No.: 16/769,568

(22) PCT Filed: Nov. 7, 2019

(86) PCT No.: PCT/KR2019/015020
§ 371 (c)(1),
(2) Date: Jun. 3, 2020

(87) PCT Pub. No.: WO2021/080071
PCT Pub. Date: Apr. 29, 2021

(65) Prior Publication Data
US 2021/0405752 A1    Dec. 30, 2021

(30) Foreign Application Priority Data
Oct. 22, 2019   (KR) .......................... 10-2019-0131359

(51) Int. Cl.
*G06F 3/01*     (2006.01)
*H02P 25/032*   (2016.01)
(Continued)

(52) U.S. Cl.
CPC ............... *G06F 3/016* (2013.01); *H02K 1/17* (2013.01); *H02K 33/10* (2013.01); *H02K 33/16* (2013.01); *H02P 25/032* (2016.02)

(58) Field of Classification Search
CPC .......... H02J 1/00; H02K 33/00; H02K 33/10; H02K 35/00; H02K 35/16; H02K 1/17;
(Continued)

(56) References Cited

U.S. PATENT DOCUMENTS 6,501,357 B2 * 12/2002 Petro ...................... H02K 33/16
                                                              335/229
6,983,923 B2 *  1/2006 Fukui ..................... F16K 31/082
                                                              335/229
(Continued)

FOREIGN PATENT DOCUMENTS

JP    H09205763 A  *  1/1996
JP    10-014195 A      1/1998
(Continued)

OTHER PUBLICATIONS

KR 2010-0065894 A English Translation.*
(Continued)

*Primary Examiner* — Maged M Almawri
(74) *Attorney, Agent, or Firm* — NKL Law; Jae Youn Kim

(57) ABSTRACT

A radial magnet actuator includes a housing having an inner space, a moving body including a mass body provided to relatively move in the inner space, and a hollow radial magnet provided in the mass body, an elastic member configured to elastically support the moving body from one side of the inner space, and a hollow coil part provided at an upper side of the inner space, with at least a portion inserted into the hollow of the radial magnet, wherein the radial magnet is magnetized in a radial direction.

7 Claims, 10 Drawing Sheets

(51) Int. Cl.
*H02K 33/16* (2006.01)
*H02K 1/17* (2006.01)
*H02K 33/10* (2006.01)

(58) Field of Classification Search
CPC ...... H02N 11/00; H02N 11/002; G06F 3/016; H02P 25/032
USPC ....... 310/29, 12, 12.12, 12.01, 12.03, 12.13, 310/12.16, 12.211, 2.24, 12.26, 25, 15
See application file for complete search history.

(56) References Cited

U.S. PATENT DOCUMENTS

| | | | | |
|---|---|---|---|---|
| 7,449,803 | B2* | 11/2008 | Sahyoun | H02K 33/16 310/23 |
| 7,586,220 | B2* | 9/2009 | Roberts | H02K 1/34 290/1 R |
| 8,130,086 | B2 | 3/2012 | Choi et al. | |
| 8,629,569 | B2* | 1/2014 | Roberts | H02K 35/06 290/1 R |
| 8,736,086 | B2* | 5/2014 | Yang | H02K 35/02 290/1 R |
| 9,356,499 | B2* | 5/2016 | Kinoshita | H02K 35/02 |
| 9,695,806 | B2* | 7/2017 | Van Brunt | H02K 33/16 |
| 10,170,969 | B2* | 1/2019 | Ohishi | H02K 35/04 |
| 10,811,949 | B2* | 10/2020 | Oonishi | H02J 1/00 |
| 2005/0225181 | A1* | 10/2005 | Tu | H02K 35/00 310/15 |
| 2006/0055252 | A1* | 3/2006 | Tseng | H02K 41/0358 310/15 |
| 2007/0052302 | A1* | 3/2007 | Cheung | B82Y 25/00 310/12.25 |
| 2007/0228736 | A1* | 10/2007 | Smushkovich | F03B 15/00 290/42 |
| 2009/0250032 | A1* | 10/2009 | Fullerton | H03K 3/45 123/143 B |
| 2010/0327672 | A1* | 12/2010 | Roberts | H02K 1/34 310/25 |
| 2011/0074231 | A1* | 3/2011 | Soderberg | H01F 3/10 335/297 |
| 2011/0198949 | A1* | 8/2011 | Furuich | H02K 33/16 310/25 |
| 2012/0133220 | A1* | 5/2012 | Hong | H02K 33/16 310/25 |
| 2012/0146557 | A1* | 6/2012 | Pyo | H02P 31/00 310/25 |
| 2012/0212097 | A1* | 8/2012 | Wasenczuk | B06B 1/04 310/216.001 |
| 2013/0285479 | A1* | 10/2013 | Kinoshita | H02K 35/02 310/12.12 |
| 2013/0342032 | A1* | 12/2013 | Laurent | H02K 35/04 310/306 |
| 2014/0192428 | A1* | 7/2014 | Park | H02K 33/18 310/12.16 |
| 2016/0126821 | A1* | 5/2016 | Iwaki | H02K 7/08 310/12.21 |
| 2019/0363622 | A1* | 11/2019 | Kim | H02K 33/16 |
| 2021/0028679 | A1* | 1/2021 | Wasenczuk | H02K 1/34 |

FOREIGN PATENT DOCUMENTS

| | | | | |
|---|---|---|---|---|
| KR | 100593917 | | 12/2005 | |
| KR | 100904743 | | 12/2008 | |
| KR | 10-0904743 | B | 6/2009 | |
| KR | 10-2010-0065894 | A | 6/2010 | |
| KR | 2010-0065894 | A * | 9/2010 | ............... G06F 3/01 |
| KR | 10-2011-0095107 | | 8/2011 | |
| KR | 10-2012-0017389 | | 2/2012 | |
| KR | 2012-0017389 | A * | 2/2012 | |
| KR | 10-2014-0045008 | | 4/2014 | |
| KR | 10-2015-0080673 | | 7/2015 | |
| KR | 10-2017-0042525 | A | 4/2017 | |
| KR | 10-2018-0056595 | | 5/2018 | |
| KR | 10-2018-0056595 | A | 5/2018 | |
| WO | WO-2018088788 | A1 * | 5/2018 | ............... G06F 3/01 |

OTHER PUBLICATIONS

KR 2012-0017389 A English Translation.*
JPH09205763A English Translation.*
R. S. Dahiya, G. Metta, M. Valle and G. Sandini, "Tactile Sensing—From Humans to Humanoids," in IEEE Transactions on Robotics, vol. 26, No. 1, pp. 1-20, Feb. 2010, doi: 10.1109/TRO.2009.2033627.

* cited by examiner

RADIAL MAGNET ACTUATOR WITH MOVING MASS HAVING A MAGNET MOVING VERTICALLY AND A COIL

TECHNICAL FIELD

Embodiments relate to a radial magnet actuator.

BACKGROUND ART

In general, a linear resonant actuator (LRA) is principally used as a haptic device. The LRA is driven in a manner that maximizes an intensity of vibration using a resonant frequency generated by a weight body connected to a magnetic circuit and an elastic spring.

A prior art related to a linear resonant actuator is disclosed in detail in KR Patent Publication No. "2005-0122101" (Title: A VERTICAL VIBRATOR), and a prior art related to an apparatus for stably obtaining a linear vibration is disclosed in KR Patent Application Publication No. "2007-0055338" (Title: A LINEAR VIBRATION GENERATOR).

The conventional LRA is directed to simply transferring vibration and needs to use a resonant frequency determined by a weight body and an elastic member for effective vibration.

The conventional haptic device may provide vibration only in a predetermined resonant frequency band and have difficulty in implementing vibration in an ultra-low frequency band (20 Hz or less) or a wide frequency band.

Thus, there is a need to develop a haptic device that may provide various tactile sensations by vibrating in a wide frequency band, rather than simply vibrating at one resonance frequency.

The above description has been possessed or acquired by the inventor(s) in the course of conceiving the present invention and is not necessarily an art publicly known before the present application is filed.

DISCLOSURE OF INVENTION

Technical Goals

An aspect provides a radial magnet actuator.

Technical Solutions

According to an aspect, there is provided a radial magnet actuator including a housing having an inner space, a moving body including a mass body provided to relatively move in the inner space, and a hollow radial magnet provided in the mass body, an elastic member configured to elastically support the moving body from one side of the inner space, and a hollow coil part provided at an upper side of the inner space, with at least a portion inserted into the hollow of the radial magnet, wherein the radial magnet may be magnetized in a radial direction.

The mass body may include an accommodation space recessed from the top thereof along a radial trajectory of a radius set from the central axis thereof, wherein the radial magnet may be inserted into the accommodation space, and the lower side of the coil part may be inserted between the inner circumferential surface of the hollow of the radial magnet and the inner circumferential surface of the accommodation space.

The housing may be provided in the shape of a cylinder with a diameter of 6 mm to 12 mm. The moving body may further include a pole piece provided to cover the top surface of the radial magnet, and the top surface of the pole piece may be on the same plane as an opening of the accommodation space.

One side of the elastic member may be fixed along the circumference of the lower edge of the inner space, and the other side thereof may be connected to be inclined toward the center of the bottom of the mass body in a radial form.

In a state in which a current is not applied to the coil part, the center of the coil part may be at an upper position by a set interval than the center of the radial magnet based on a vertical direction.

The mass body may further include a depression formed as the central portion thereof inside the accommodation space is recessed from the top thereof.

The mass body may further include a protrusion protruding upward from the central portion inside the accommodation space toward the top of the housing.

The radial magnet actuator may further include a controller configured to apply an alternating current to the coil part, wherein when the controller applies an alternating current of a frequency band between 1 Hz to 20 Hz to the coil part, a cumulative impulse formed by the moving body within a unit interval of 50 ms may be 3 mNs or greater, such that a haptic effect corresponding to tapping may be formed.

According to an aspect, there is provided a radial magnetic actuator including a housing having an inner space, a moving body including a mass body provided to relatively move in the inner space, and a hollow coil part provided in the mass body, an elastic member configured to elastically support the moving body from one side of the inner space, a radial magnet including a hollow provided in the inner space, the hollow into which the lower side of the coil part is to be inserted, and a yoke member including an annular accommodation space in which the radial magnet is provided and the lower side of the coil part is to be inserted, wherein the radial magnet may be magnetized in a radial direction.

The yoke member may include an edge portion disposed to enclose the outer circumferential surface of the radial magnet, and a central portion to be inserted into the hollow of the radial magnet, wherein the accommodation space may be formed between the edge portion and the central portion.

The mass body may include a groove recessed such that the central portion is to be inserted from the bottom, and the coil part may be provided to enclose the outer circumferential surface of the mass body.

The elastic member may be provided in the form of a flat plate connecting the inner circumferential surface of the inner space and the mass body in a plane direction perpendicular to a vertical direction.

In a state in which a current is not applied to the coil part, the center of the coil part may be at an upper position by a set interval than the center of the radial magnet based on a vertical direction.

The diameter of the yoke member may be less than the diameter of the inner space, and the housing may include a guide housing interposed between the inner circumferential surface of the inner space and the outer circumferential surface of the edge portion.

The housing may further include an upper housing configured to cover the top surface of the inner space, wherein the edge portion of the elastic member may be supported downward by the guide housing and be pressurized upward by the upper housing.

The radial magnet actuator may further include a controller configured to apply an alternating current to the coil part, wherein the bandwidth of a driving frequency, in which the magnitude of a vibration force formed when the controller applies an alternating current to the coil part is measured at 0.5 G or more, may be greater than or equal to 200 Hz.

The central portion may further include a depression recessed from the top thereof.

The radial magnet actuator may further include a controller configured to apply an alternating current to the coil part, wherein when the controller applies an alternating current of a frequency band between 1 Hz to 20 Hz to the coil part, a cumulative impulse formed by the moving body within a unit interval of 50 ms may be 3 mNs or greater, such that a haptic effect corresponding to tapping may be formed.

Effects

According to an embodiment, a radial magnet actuator may effectively control a magnetic leakage by effectively controlling a density and a direction of magnetic flux through a radial magnet actuator.

According to an embodiment, a radial magnet actuator may have a wide bandwidth in a resonant frequency band and thus, provide various haptic effects to a user.

According to an embodiment, a radial magnet actuator may transfer a haptic effect to a user even in an ultra-low frequency band.

According to an embodiment, a radial magnet actuator may transfer a tactile sensation directly to a user through a protrusion externally protruding, thereby more effectively transferring a haptic effect directly to the user, in comparison to a case of transferring a tactile sensation indirectly to a user through a housing.

BEST MODE FOR CARRYING OUT THE INVENTION

Figure 1:
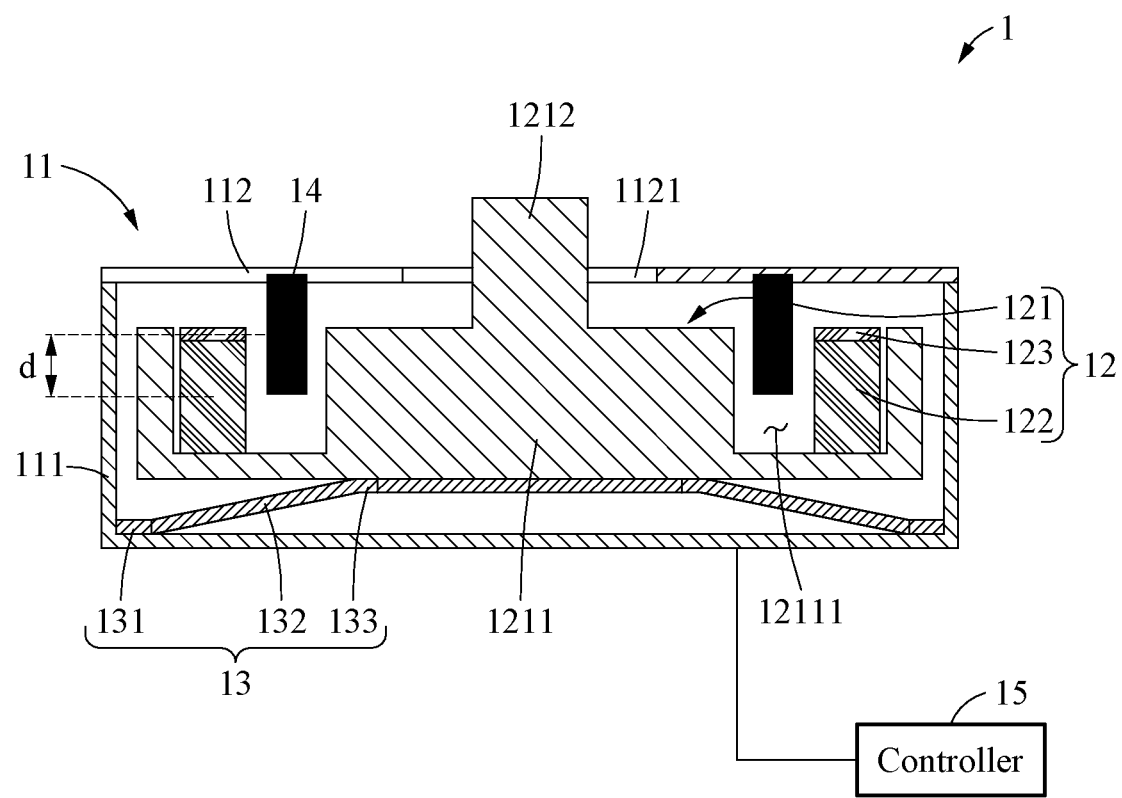
FIG. 1 is a cross-sectional view of a radial magnet actuator according to an embodiment.

Hereinafter, embodiments of the present disclosure will be described with reference to the accompanying drawings. Regarding the reference numerals assigned to the components in the drawings, it should be noted that the same components will be designated by the same reference numerals, wherever possible, even though they are shown in different drawings. Also, in the description of the embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions on the embodiments may be applicable to the following embodiments and thus, duplicated descriptions will be omitted for conciseness.

FIG. 1 is a cross-sectional view of a radial magnet actuator according to an embodiment.

Referring to FIG. 1, a radial magnet actuator 1 may have a resonant frequency band in a wide bandwidth ranging about 190 Hz to 420 Hz, and generate a haptic effect perceptible by a user even in an ultra-low frequency band less than 20 Hz. When a controller 15, which will be described later, applies an alternating current to a coil part 14, the bandwidth of a driving frequency of the radial magnet actuator 1 in which the magnitude of a vibration force is measured at 0.5 G or more may be greater than or equal to 200 Hz.

The radial magnet actuator 1 may include a cylindrical housing 11 having an inner space, a moving body 12 including a radial magnet 122 to relatively move in the inner space of the housing 11, an elastic member 13 configured to elastically support the moving body 12 from the inside of the housing 11, the coil part 14 provided at an upper side of the inner space to form a magnetic field in the radial magnet 122, and the controller 15 configured to adjust a characteristic of the current applied to the coil part 14.

The housing 11 may be a cylindrical member having an inner space. The inner space of the housing 11 may be provided in the shape of a cylinder.

The housing 11 may be provided in the shape of a cylinder with a diameter of 6 mm to 12 mm.

The housing 11 may include a lower housing 111, and an upper housing 112.

The lower housing 111 may enclose the bottom and the side of the inner space. For example, the lower housing 111 may be provided in the shape of a cylinder with an opened top.

The upper housing 112 may be connected to the top of the lower housing 111 to shield at least a portion of the inner space from the top.

The upper housing 112 may be provided in a circular shape. In this example, the edge portion of the circular shape of the upper housing 112 may be connected to fit into the edge portion of an upwardly exposed circular opening of the portion of the lower housing 111.

The upper housing 112 may include a hollow 1121 formed to penetrate through the central portion thereof.

The moving body 12 may move relative to the housing 11 by a magnetic force formed in the inner space, in a state of being supported by the elastic member 13 in the inner space of the housing 11.

The moving body 12 may include a mass body 121 elastically supported by the elastic member 13, the radial magnet 122 provided in the mass body 121, and a pole piece 123 configured to prevent a leakage of magnetic force of the radial magnet 122.

The mass body 121 may be connected to the elastic member 13 to move in a vertical direction in the inner space. For example, the mass body 121 may be supported from the lower side of the inner space through the elastic member 13. The mass body 121 may be provided in a circular shape. In this example, the central axis of the circular mass body 121 may coincide with the central axis of the circular inner space.

The mass body 121 may be formed of a soft magnetic material with an intrinsic coercivity of at least 1000 A/m or less, among ferromagnetic materials. For example, the mass body 121 may include at least one structure among steel, powder, an alloy, alloy powder, a composite, and a nanostructure including at least one of elements such as Fe, Ni, Si, Mn, and Zn which are soft magnetic materials.

The mass body 121 may include an element such as Cu or W of which the specific gravity is at least 8, among paramagnetic materials. For example, the mass body 121 may include at least one structure among an alloy, alloy powder, a composite, and a nanostructure including at least one of Fe, Ni, Si, Mn, and Zn which are soft magnetic materials.

The mass body 121 may include at least one structure among steel, powder, an alloy, alloy powder, a composite, and a nanostructure including at least one of elements such as Fe, Co, Ni, Nd, Ni, B, and Zn which are ferromagnetic materials.

The mass body 121 may include an accommodator 1211 received in the inner space of the housing 11 and elastically supported by the elastic member 13, the accommodator 1211 configured to accommodate the radial magnet 122, and a protrusion 1212 protruding upward from the accommodator 1211.

The accommodator 1211 may be provided in a circular shape, and the central axis of the accommodator 1211 may coincide with the central axis of the inner space.

The accommodator 1211 may include an accommodation space 12111 recessed from the top along a radial trajectory of a radius set from the central axis thereof.

The radial magnet 122 may be provided in the accommodation space 12111. When viewed from the top, the accommodation space 12111 may be provided in an annular shape centered at the central axis of the accommodation space 12111, that is, the protrusion 1212. That is, the accommodation space 12111 may be recessed from the top along a radial trajectory of a radius set from the central axis of the mass body 121.

The hollow radial magnet 122 may be inserted and provided in the accommodation space 12111.

At least a portion of the coil part 14 provided in the upper side of the inner space may be inserted into the accommodation space 12111.

The radial magnet 122 may be inserted adjacent to the outer circumferential surface of the accommodation space 12111, and at least a portion of the coil part 14 may be inserted into an annular space near the inner circumferential surface of the accommodation space 12111 not occupied by the radial magnet 122.

That is, at least a portion of the lower side of the coil part 14 may be inserted into a space between the inner circumferential surface of the hollow of the radial magnet 122 and the inner circumferential surface of the accommodation space 12111.

By the structure in which the radial magnet 122 and the coil part 14 are accommodated in the accommodation space 12111, a line of magnetic force emitted from the radial magnet 122 may be distributed to be concentrated in the coil part 14 accommodated in the accommodation space 12111.

The protrusion 1212 may protrude upward from the center of the accommodator 1211, pass through the upper housing 112, and protrude upward. For example, in a state in which a current is not applied to the coil part 14, the protrusion 1212 may pass through the hollow 1121 of the upper housing 112 to be externally exposed.

The protrusion 1212 protruding toward the top of the housing may transfer a haptic effect formed by the motion of the moving body 12 according to the drive of the radial magnet actuator 1 to the outside.

The radial magnet 122 may be an annular magnetic body including an inner hollow, and be provided in the annular accommodation space 12111.

The outer circumferential surface of the radial magnet 122 may be provided adjacent to face the outer circumferential surface of the accommodation space 12111.

The central axis of the radial magnet 122 may be coaxial with the central axis of the accommodation space 12111. For example, the radial magnet 122 may be magnetized in a radial direction. In detail, the inner side of the radial magnet 122 may have a polarity of one of the N pole and the S pole, and the outer side thereof may have a polarity of the other.

The width of the radial magnet 122 in the radial direction may be less than the width of the accommodation space 12111 in the radial direction based on the central axis of the moving body 12. Thus, the accommodation space 12111 may include an annular empty space formed between the inner circumferential surface of the radial magnet 122 and the inner circumferential surface of the accommodation space 12111, and the lower portion of the annular coil part 14 may be inserted into the space.

The height of the top surface of the radial magnet 122 may not exceed the height of the top surface of the moving body.

The pole piece 123 may be provided to cover the top surface of the radial magnet 122, thereby inducing the magnetic force of the radial magnet 122 not to be leaked upward. The top surface of the pole piece 123 may not exceed the height of the top surface of the accommodator 1211.

The top surface of the pole piece 123 may be on the same plane as a top opening of the accommodation space 12111, that is, the top surface of the moving body 12.

On at least one of the top surface and the bottom surface of the pole piece 123 may be provided a cushion or a damper to alleviate an impact by collision with the upper housing 112.

The elastic member 13 may be an elastic body with one side fixed to the bottom of the inner space and the other side supporting the lower side of the accommodator 1211.

The elastic member 13 may be provided in the shape connected to be inclined toward the center of the bottom of the accommodator 1211 radially from the edge portion of the bottom of the inner space.

The elastic member 13 may include a low-paramagnetic material or a diamagnetic material. For example, the elastic member 13 may include a material having elasticity that may be restored to its original shape at the same time an external force disappears even when its exterior is deformed by the external force, such as, for example, stainless steel, plastic, or rubber.

The elastic member 13 may include a fixed portion 131 fixed along the edge portion of the bottom of the inner space, a connecting portion 132 extending to be inclined upward from the fixed portion 131 toward the lower side of the accommodator 1211, and a supporting portion 133 connected from the connecting portion 132 and fixed to the lower side of the accommodator 1211.

The fixed portion 131 or the supporting portion 133 may have at least one fixing point and include at least one annular segment, and the supporting portion 133 and the fixed portion 131 may be linked by at least one connecting portion 132.

In another example, the elastic member 13 may include an elastic material in the shape of a flat plate connected from the edge portion of the inner space to the accommodator 1211.

The coil part 14 may form a magnetic field to be applied to the moving body 12. For example, the coil part 14 may be provided to extend downward from the bottom surface of the upper housing 112. The coil part 14 may receive an alternating current from the controller 15 to form a magnetic field where the polarity alternately changes in a vertical direction. The coil part 14 may include a planar coil, a solenoid coil, and an electromagnetic coil having a core part including a soft magnetic material.

The coil part 14 may be provided in a cylindrical shape having a hollow. For example, a portion of the protrusion 1212 and the accommodator 1211 may be inserted into the coil part 14.

A portion of the lower side of the coil part 14 may be inserted into the accommodation space 12111 of the accommodator 1211 and at the same time inserted into the hollow of the radial magnet 122.

In a state in which a current is not applied to the coil part 14, at least portion of the lower side of the coil part 14 may be accommodated in the annular accommodation space 12111, thereby maintaining a state of being inserted into the hollow of the radial magnet 122 provided in the accommodation space 12111.

In the state in which a current is not applied to the coil part 14, the center of the coil part 14 may be at an upper position by a predetermined distance d than the center point of the radial magnet 122 based on the vertical direction.

By the structure in which the coil part 14 is positioned to be biased toward the upper side of the radial magnet 122, it is possible to form a great magnetic force to move upward or downward the coil part 14 having a polarity that vertically changes when a current is initially applied, and thus the response speed may increase effectively.

When an alternating current is applied to the coil part 14, the moving body 12 may perform a motion in a vertical direction in a state of being connected to the elastic member 13, and the magnetic flux direction of the radial magnet 122 and the motion direction of the moving body 12 may be formed to be perpendicular to each other.

The controller 15 may move the moving body 12 in the vertical direction by applying the alternating current to the coil part 14. For example, the controller 15 may adjust the waveform and the frequency of the current applied to the coil part 14. The controller 15 may drive the moving body 12 through a plurality of driving modes.

In a general vibration mode, the controller 17 may apply a sine wave of a resonant frequency band between 190 Hz and 420 Hz to the coil part 14, thereby driving the moving body 12 in a wide frequency band.

If the controller 15 applies a sine wave of a frequency band between 190 Hz and 420 Hz to the coil part 14, the moving body 12 may form a vibration force of more than 0.2 G, which corresponds to the magnitude of a general vibration force through which a human may sense a tactile sensation or a haptic effect.

In a tapping mode, the controller 15 may apply a rectangular wave of a frequency band between 1 Hz and 20 Hz to the coil part 14, thereby forming a haptic effect corresponding to "tapping" in which the amplitude of a vibration force formed by the moving body 12 intermittently changes.

The controller 15 may apply an alternating current of a rectangular waveform of less than 20 Hz to the coil part 14 to form the haptic effect corresponding to tapping.

By the radial magnet actuator 1, the accommodator 1211 may have a structure provided to perfectly enclose the side of the coil part 14 in addition to the radial magnet 1, such that a great and uniform magnetic field may be applied throughout the entire portion of the coil part 14 during the entire period of the vertical motion performed by the moving body 12, and thus a great vibration force, a high response speed, and drive stability may be secured.

Figure 2:
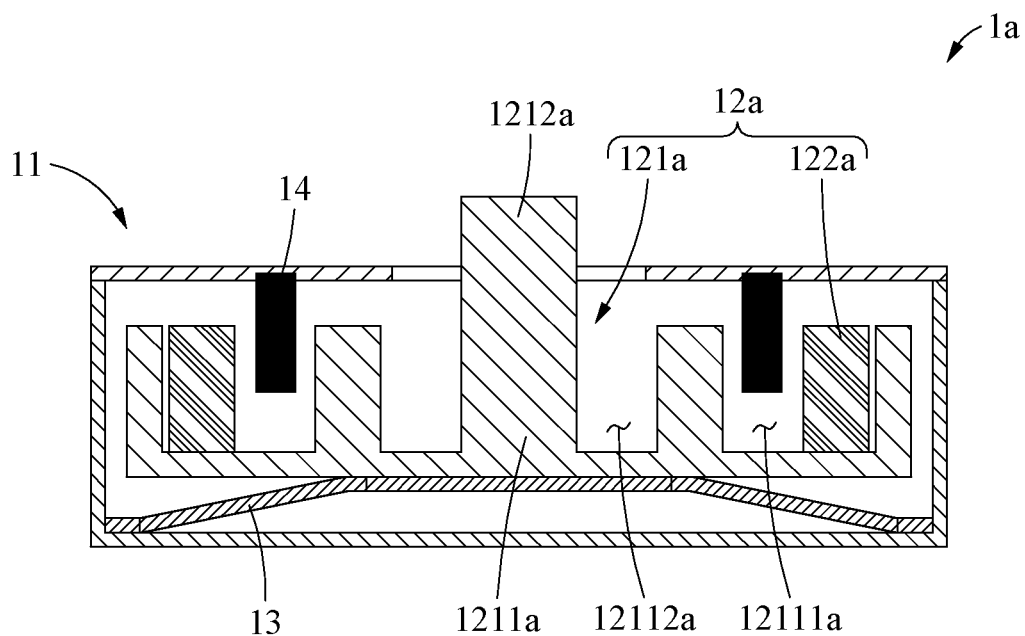
FIGS. 2 through 4 are cross-sectional views illustrating various modified examples of the radial magnet actuator of FIG. 1.
Figure 3:
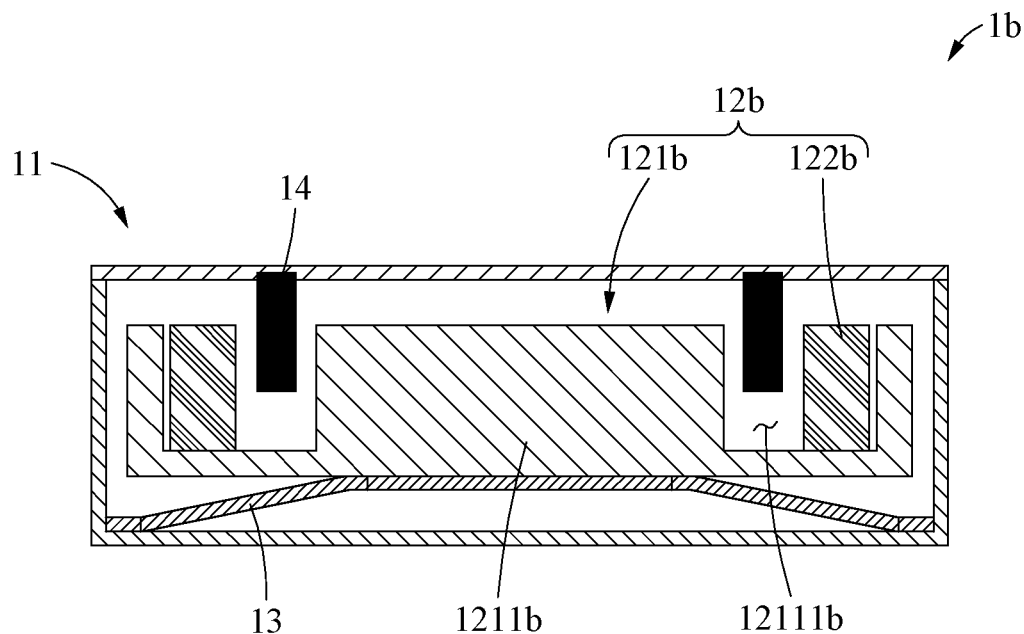
Figure 4:
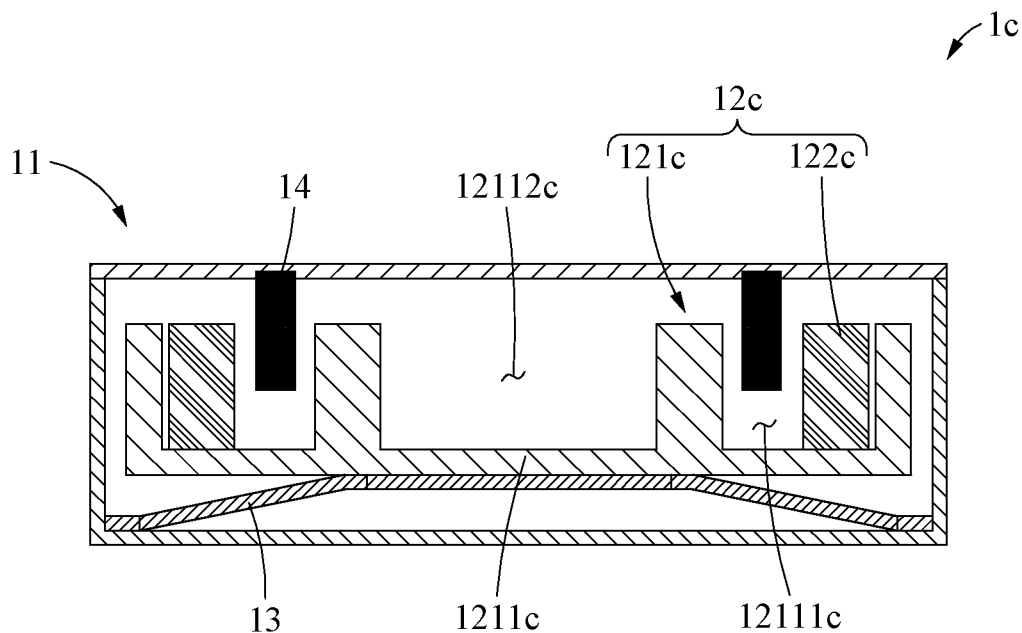

FIGS. 2 through 4 are cross-sectional views illustrating various modified examples of the radial magnet actuator of FIG. 1.

Referring to FIGS. 2 through 4, the configurations of various examples of radial magnet actuators 1a, 1b, and 1c provided in structures modified from that of the radial magnet actuator 1 of FIG. 1 are shown.

First, referring to FIG. 2, an accommodator 1211a of the radial magnet actuator 1a may include an accommodation space 12111a and an additional depression 12112a recessed from the top surface thereof.

The depression 12112a may be additionally recessed between a protrusion 1212a and the accommodation space 12111a based on the central axis of the accommodator 1211a.

By the above structure, while maintaining the structure in which the accommodator 1211a encloses a radial magnet 122a and the coil part 14 through the accommodation space 12111a in both directions, an unnecessary portion between the protrusion 1212a and the accommodation space 12111a may be removed, whereby the weight of a moving body 12a may be reduced, such that the weight of the radial magnet actuator 1a may be reduced.

By the radial magnet actuator 1, 1a including the protrusion 1212, 1212a, a haptic effect may be directly transferred through direct contact with a user outside. Thus, it is possible to transfer a more effective and realistic haptic effect, when compared to a manner that transfers a haptic effect indirectly to the user through a housing.

The radial magnet actuator 1b of FIG. 3 may be provided in the form in which the protrusion 1212 is removed from the radial magnet actuator 1 of FIG. 1.

As the protrusion 1212 is removed from a moving body 12b, the hollow 1121 of the upper housing 112 may also be removed, such that the inner space of the upper housing 112 may be completely shielded.

The radial magnet actuator 1b of FIG. 3 may be provided in the structure not including the protrusion 1212 that directly transfers the vibration force of the moving body 12b, and thus the haptic effect formed through the motion of the moving body 12b may be indirectly transferred through the housing 11 that moves relative to the moving body 12b.

The radial magnet actuator 1c of FIG. 4 may be construed as being in a structure in which the central portion of an accommodator 1211c is additionally recessed, modified from the structure of the radial magnet actuator 1b of FIG. 3.

The radial magnet actuator 1c may further include a depression 12112c additionally recessed at the central portion, excluding the portion enclosing a radial magnet 122c and the coil part 14, to form an accommodation space 12111c.

By the structure of the radial magnet actuator 1c of FIG. 4, the central portion on the inner side excluding the accommodation space 12111c, in the portion of the accommodator 1211c, may be recessed, whereby the weight of a moving body 12c may be reduced, such that the weight of the radial magnet actuator 1c may be reduced.

Figure 5:
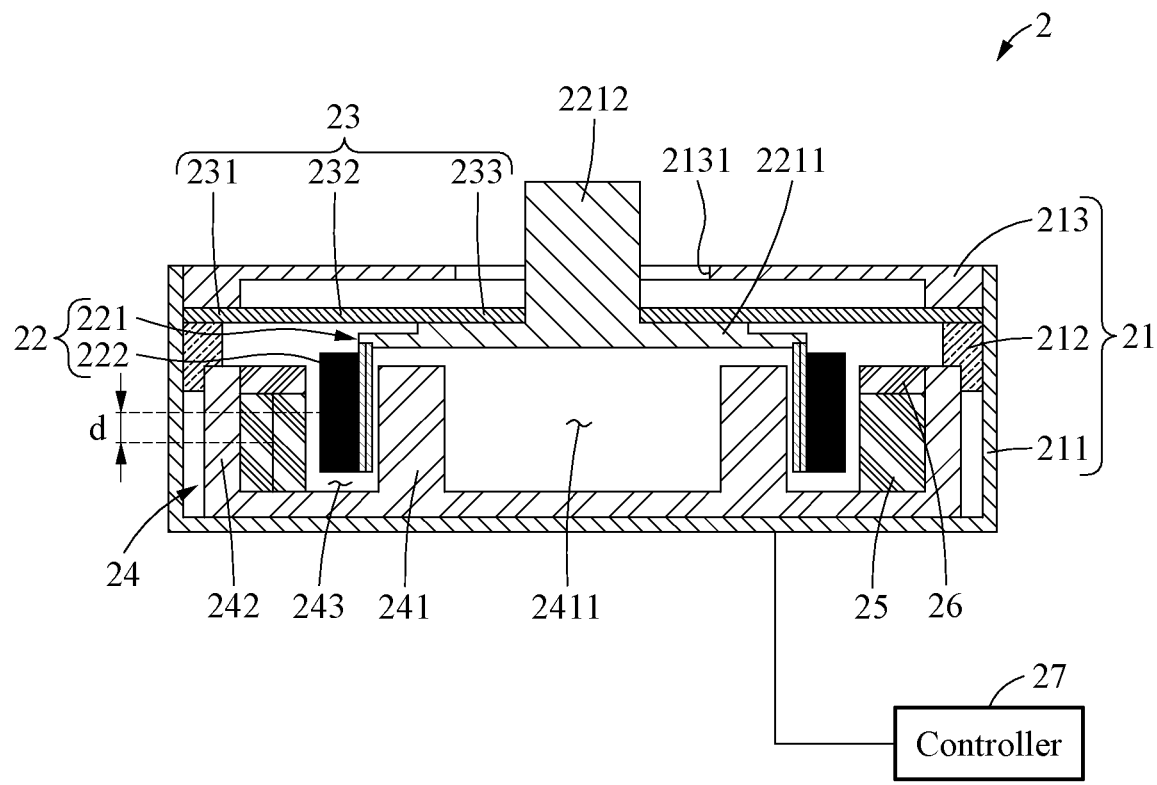
FIG. 5 is a cross-sectional view of a radial magnet actuator according to an embodiment.

FIG. 5 is a cross-sectional view of a radial magnet actuator according to an embodiment.

Referring to FIG. 5, a configuration of a radial magnet actuator 2 having a structure different from that of the radial magnet actuator 1 shown in FIGS. 1 through 4 is shown.

The radial magnet actuator 2 may include a cylindrical housing 21 having an inner space, a yoke member 24 provided in the inner space, the yoke member 24 including an accommodation space 243 in which a radial magnet 25 is provided and a coil part 222 is to be inserted, the hollow radial magnet 25 provided in the accommodation space 243 of the yoke member 24, a pole piece 26 configured to prevent a leakage of a magnetic force of the radial magnet 25, a moving body 22 including a hollow coil part 222, the moving body 22 configured to move relatively in the housing 21, an elastic member 23 configured to elastically support the moving body 22 from the inside of the housing 21, and a controller 27 configured to adjust a characteristic of a current to be applied to the coil part 222.

The housing 21 may be a cylindrical member having the inner space. For example, the inner space of the housing 21 may be in a cylindrical form.

The housing 21 may include a lower housing 211, a guide housing 212, and an upper housing 213.

The lower housing 211 may enclose the circumference of the yoke member 24. For example, the lower housing 211 may be provided in the shape of a cylinder with an opened top, and the yoke member 24 may be inserted and arranged therein from the top.

The guide housing 212 may support the top edge of the yoke member 24 such that the yoke member 24 may not be separated from the lower housing 211, and support the edge of the elastic member 23 on the upper side thereof.

The guide housing 212 may be connected between the inner surface of the lower housing 211 and the outer surface of the yoke member 24 in the inner space of the lower housing 211, to support such that the central axis of the yoke member 24 may be coaxial with the central axis of the housing 21.

The lower end portion of the guide housing 212 may be provided in the shape in which the end portion of the yoke member 24 fits, in a state in which the outer circumferential surface of the yoke member 24 is spaced apart from the inner wall of the inner space.

The upper housing 213 may be connected to the upper side of the guide housing 212. For example, the upper housing 213 may be a circular member that fits in the inner circumferential surface of the lower housing 211.

The upper housing 213 may be provided to shield at least a portion of a top entrance of the inner space, on the upper side of the lower housing 211.

The lower side of the upper housing 213 may be connected to the upper side of the edge of the elastic member 23 supported by the guide housing 212. Thus, the edge of the elastic member 23 may be pressurized and fixed bidirectionally in a vertical direction by the guide housing 212 and the upper housing 213.

The yoke member 24 may be a magnetic body that is provided on the bottom of the inner space of the housing 21 to induce a flow of a magnetic field. For example, the yoke member 24 may distribute a line of magnetic force emitted from the radial magnet 25 to be concentrated in the coil part 222 accommodated in the yoke member 24.

The yoke member 24 may be formed of a soft magnetic material with an intrinsic coercivity of at least 1000 A/m or less, among ferromagnetic materials. For example, the yoke member 24 may include at least one structure among steel, powder, an alloy, alloy powder, a composite, and a nanostructure including at least one of elements such as Fe, Ni, Si, Mn, and Zn which are soft magnetic materials.

The yoke member 24 may include an element such as Cu or W of which the specific gravity is at least 8, among paramagnetic materials. For example, the yoke member 24 may include at least one structure among an alloy, alloy powder, a composite, and a nanostructure including at least one of Fe, Ni, Si, Mn, and Zn which are soft magnetic materials.

The yoke member 24 may include at least one structure among steel, powder, an alloy, alloy powder, a composite, and a nanostructure including at least one of elements such as Fe, Co, Ni, Nd, Ni, B, and Zn which are ferromagnetic materials.

The yoke member 24 may include an edge portion 242 configured to enclose the outer side of the coil part 222 and the radial magnet 25, a central portion 241 positioned on the inner side of the coil part 222 and the radial magnet 25, and the accommodation space 243 recessed in a portion between the edge portion 242 and the central portion 241 to accommodate the coil part 222 and the radial magnet 25.

The outer circumferential surface of the edge portion 242 may be provided to face the inner circumferential surface of the lower housing 211, and the inner circumferential surface of the edge portion 242 may enclose the outer circumferential surface of the radial magnet 25.

The diameter of the edge portion 242 may be less than the diameter of the inner space. Thus, when the lower end portion of the guide housing 212 described above is inserted and fits in between the outer circumferential surface of the edge portion 242 and the inner circumferential surface of the inner space, the yoke member 24 may be fixed in the inner space.

The yoke member 24 may have a fixed position as being inserted and fitting in by the guide housing 212, and the elastic member 23 may also be fixed as being inserted and fitting in between the guide housing 212 and the upper housing 213.

The radial magnet actuator 2 may be assembled without separate glue or coupling by a fastening element and thus, may achieve simple assembly and disassembly and reduction in weight.

The central portion 241 may be provided to be coaxial with the central axis of the inner space. For example, at least a portion of the central portion 241 may be inserted into the hollow of the coil part 222.

The central portion 241 may include a depression 2411 recessed at the center thereof. By the depression 2411, a portion of the yoke member 24 excluding the portion enclosing the radial magnet 25 and the coil part 222 may be removed, whereby the weight of the radial magnet actuator 2 may be reduced.

The radial magnet 25 may be provided in the accommodation space 243. When viewed from the top, the accommodation space 243 may have an annular shape based on the central axis of the yoke member 24, that is, the central axis of the inner space.

The annular radial magnet 25 may be inserted and provided in the accommodation space 243, and at least a portion of the coil part 222 of the moving body 22 may be inserted into the accommodation space 243 from the top.

The radial magnet 25 may be inserted adjacent to the outer circumferential surface of the accommodation space 243, and at least a portion of the coil part 222 may be inserted into an annular space near the inner circumferential surface of the accommodation space 243 not occupied by the radial magnet 25.

By the structure in which the radial magnet 25 and the coil part 222 are accommodated in the accommodation space 243, the yoke member 24 may induce a line of magnetic force emitted from the radial magnet 25 to pass as being concentrated in the coil part 222 accommodated in the accommodation space 243, thereby applying a great uniform magnetic force to the coil part 222.

The radial magnet 25 may be an annular magnetic body including an inner hollow, and be provided in the annular accommodation space 243.

The outer circumferential surface of the radial magnet 25 may be provided to contact the outer circumferential surface of the accommodation space 243. For example, the radial magnet 25 may be magnetized in a radial direction.

The internal diameter of the radial magnet 25 may be less than the internal diameter of the accommodation space 243 based on the central axis of the inner space. Thus, the accommodation space 243 may include an annular empty space formed between the inner circumferential surface of the radial magnet 25 and the inner circumferential surface of the accommodation space 243, and the lower portion of the annular coil part 222 may be inserted into the space.

The pole piece 26 may be provided to cover the top surface of the radial magnet 25 to induce the magnetic force of the radial magnet 25 not to be leaked upward. For example, the top surface of the pole piece 26 may have the same height as the top surface of the yoke member 24.

On at least one of both sides of the pole piece 26 may be provided a cushion or a damper to alleviate an impact by collision with the moving body 22.

The moving body 22 may be provided in the inner space of the housing 21 and move in a vertical direction by magnetic force flowing in the accommodation space 243.

The moving body 22 may include a mass body 221 elastically supported by the elastic member 23, and the coil part 222 provided in the mass body 221.

The mass body 221 may be connected to the elastic member 23 to move in a vertical direction in the inner space. For example, the mass body 221 may be supported in a state of being separated from the inner circumferential surface of the inner space through the elastic member 23. The mass body 221 may be provided in a circular shape. In this example, the central axis of the circular mass body 221 may coincide with the central axis of the circular inner space.

The mass body 221 may include an insertion part 2211 accommodated in the inner space of the housing 21 and elastically supported by the elastic member 23, and a protrusion 2212 protruding upward from the insertion part 2211.

The insertion part 2211 may include a groove recessed from the bottom and be in the shape of a cylindrical cup in which the lower edge portion may be inserted into the accommodation space 243.

The central portion 241 of the yoke member 24 may be inserted into the groove of the insertion part 2211, and the insertion part 2211 and the coil part 222 provided along the circumference of the insertion part 2211 may be inserted into the accommodation space 243 of the yoke member 24.

The protrusion 2212 may protrude upward from the center of the insertion part 2211, pass through the upper housing 213, and protrude upward. For example, in a state in which a current is not applied to the coil part 222, the protrusion 2212 may pass through a hollow 2131 of the upper housing 213 to be externally exposed.

The protrusion 2212 protruding toward the top of the housing 21 may transfer a haptic effect formed by the motion of the moving body 22 according to the drive of the radial magnet actuator 2 to the outside.

The coil part 222 may be provided along the circumference of the edge of the circular insertion part 2211. For example, the coil part 222 may receive an alternating current from the controller 27 to form a magnetic field where the polarity alternately changes in a vertical direction.

The coil part 222 may be provided to enclose the outer circumferential surface of the insertion part 2211.

The coil part 222 may include a planar coil, a solenoid coil, and an electromagnetic coil having a core part including a soft magnetic material.

The elastic member 23 may elastically support the moving body 22 from one side of the inner space. The elastic member 23 may be formed of an elastic material in the shape of a flat plate connecting the inner circumferential surface of the inner space and the mass body 221 in a plane direction perpendicular to a vertical direction.

The elastic member 23 may include a fixed part 231 fixed to the inner circumferential surface of the inner space, an extension 232 horizontally extending from the fixed part 231 toward the mass body 221, and a support 233 connected to the extension 232 and fixed to the mass body 221.

The fixed part 231 may be supported by the guide housing 212 from the lower side at the edge portion of the inner space and pressurized by the upper housing 213 from the top, and may thereby be fixed as being inserted and fitting in between the guide housing 212 and the upper housing 213.

By the elastic member 23, the moving body 22 may be elastically supported while being spaced to be out of contact with the remaining elements except for the inner wall of the housing 21 and the elastic member 23.

At least a portion of the coil part 222 may maintain a state of being inserted into the accommodation space 243, even in a state in which the moving body 22 is moved with the maximum displacement in an upward motion direction.

Based on an initial state in which a current is not applied to the coil part 222, the elastic member 23 may elastically support the moving body 22 from the housing 21 while maintaining a horizontal state.

If a current is not applied to the coil part 222, the center point of the coil part 222 may be at an upper position by a predetermined distance d than the center point of the radial magnet 25 based on the vertical direction.

By the structure in which the coil part 222 is positioned to be biased toward the upper side of the radial magnet 25, it is advantageous in forming a great magnetic force to move upward or downward the coil part 222 having a polarity that vertically changes when a current is initially applied, and thus the response speed may increase effectively.

When an alternating current is applied to the coil part 222, the moving body 22 may perform a motion in a vertical direction in a state of being connected to the elastic member 23, and the magnetic flux direction of the radial magnet 25 and the motion direction of the moving body 22 may be formed to be perpendicular to each other.

The controller 27 may move the moving body 22 in the vertical direction by applying the current to the coil part 222. For example, the controller 27 may apply a direct current or an alternating current to the coil part 222. The controller 27 may adjust the waveform and the frequency of the current applied to the coil part 222. The controller 27 may drive the moving body 22 through a plurality of driving modes.

In a general vibration mode, the controller 17 may apply a sine wave of a resonant frequency band between 190 Hz and 420 Hz to the coil part 222, thereby driving the moving body 22 in a wide frequency band.

If the controller 27 applies a sine wave of a frequency band between 190 Hz and 420 Hz to the coil part 222, the moving body 22 may form a vibration force of more than 0.2 G, which corresponds to the magnitude of a general vibration force through which a human may sense a tactile sensation or a haptic effect.

In a tapping mode, the controller 27 may apply a rectangular wave of a frequency band between 1 Hz and 20 Hz to the coil part 222, thereby forming a haptic effect corresponding to "tapping" in which the amplitude of a vibration force formed by the moving body 22 intermittently changes.

The controller 27 may apply an alternating current of a rectangular waveform of less than 20 Hz to the coil part 222 to form the haptic effect corresponding to tapping.

Figure 6:
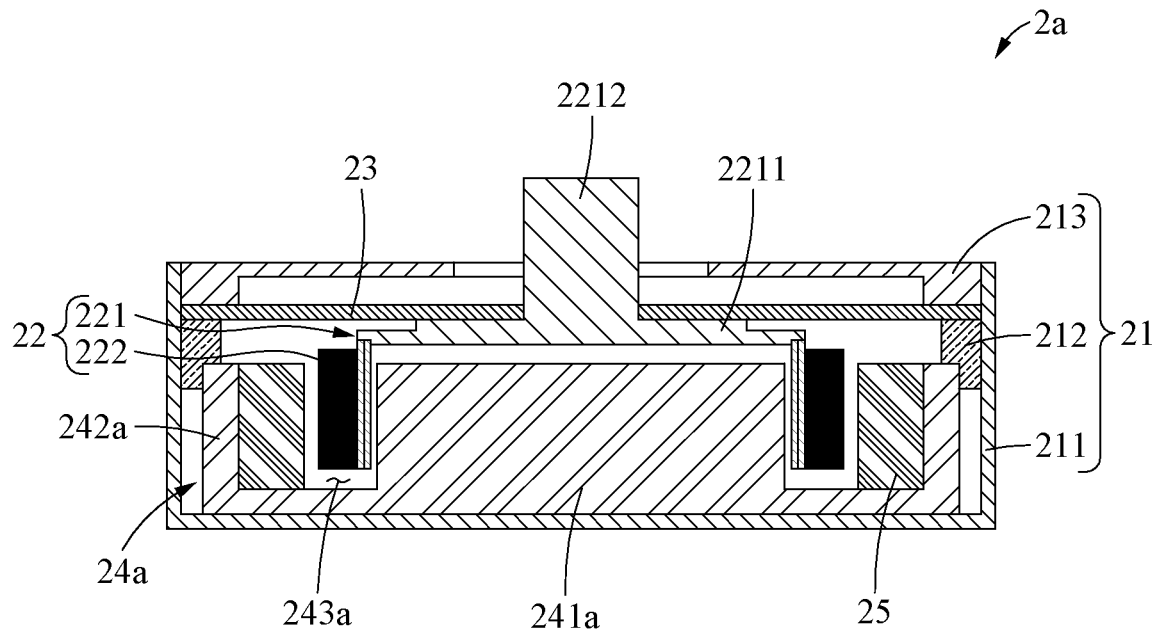
FIGS. 6 through 8 are cross-sectional views illustrating various modified examples of the radial magnet actuator of FIG. 5.
Figure 7:
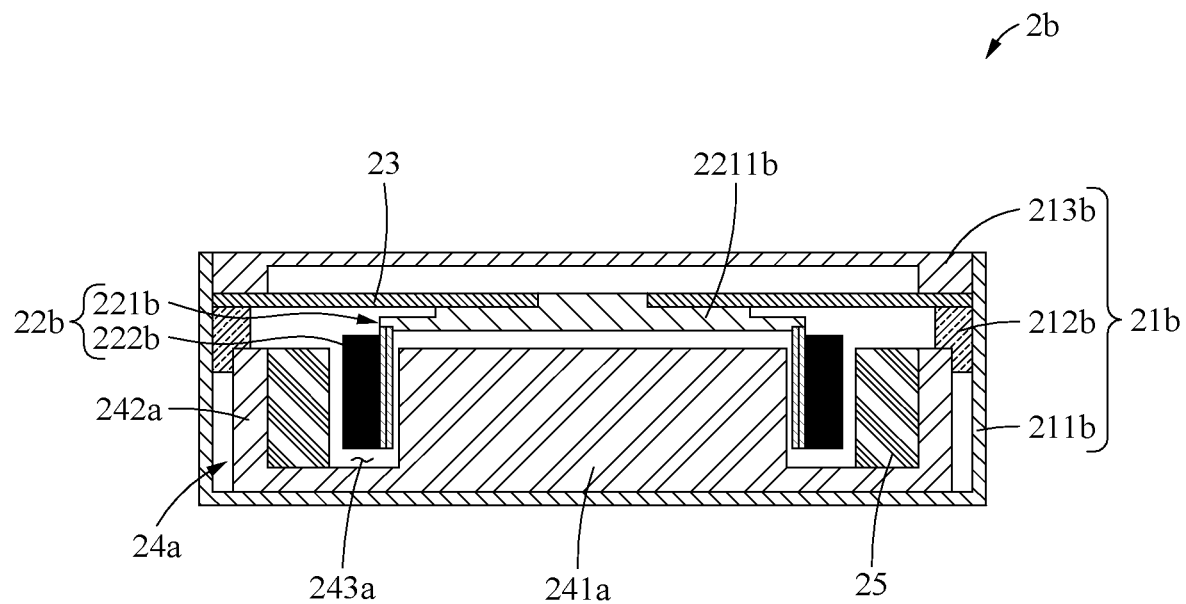
Figure 8:
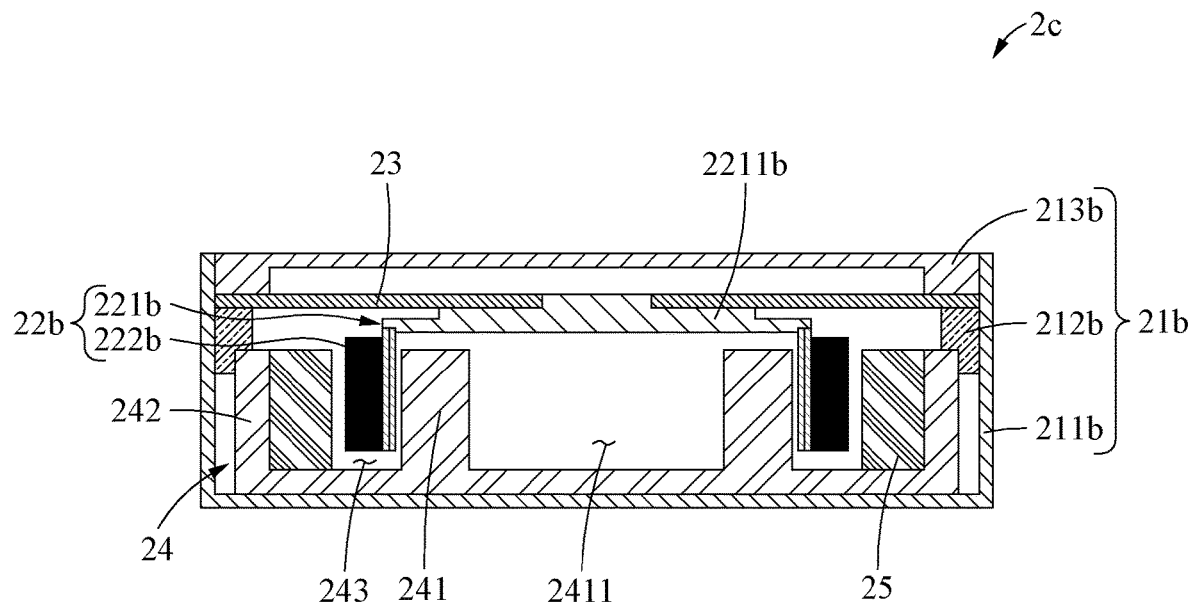

FIGS. 6 through 8 are cross-sectional views illustrating various modified examples of the radial magnet actuator of FIG. 5.

Referring to FIGS. 6 through 8, the configurations of various examples of radial magnet actuators 2a, 2b, and 2c provided in structures modified from that of the radial magnet actuator 1 of FIG. 5 are shown.

First, a yoke member 24a of the radial magnet actuator 2a of FIG. 6 may not include a recessed portion at the center of a central portion 241a of the yoke member 24a, unlike the radial magnet actuator 2 of FIG. 5. Refer By the radial magnet actuator 2, 2a including the protrusion 2212, a haptic effect may be directly transferred through direct contact with a user outside. Thus, it is possible to transfer a more effective and realistic haptic effect, when compared to a manner that transfers a haptic effect indirectly to the user through a housing.

The radial magnet actuator 2b of FIG. 7 may be provided in the form in which the protrusion 2212 is removed from the radial magnet actuator 2a of FIG. 6.

As the protrusion 2212 is removed from a moving body 22b, a hollow of an upper housing 213b may also be removed, such that the inner space may be completely shielded from the upper side of the upper housing 213b.

The radial magnet actuator 2b of FIG. 7 may be provided in the structure not including the protrusion 2212 that directly transfers the vibration force of the moving body 22b, and thus the haptic effect formed through the motion of the moving body 22b may be indirectly transferred through a housing 21b that moves relative to the moving body 22b.

The radial magnet actuator 2c of FIG. 8 may be provided in the form in which the protrusion 2212 is removed from the radial magnet actuator 2 of FIG. 5.

Similarly, as the protrusion 2212 is removed from the moving body 22b, the hollow of the upper housing 213b may also be removed, such that the inner space may be completely shielded from the upper side of the upper housing 213b.

Figure 9:
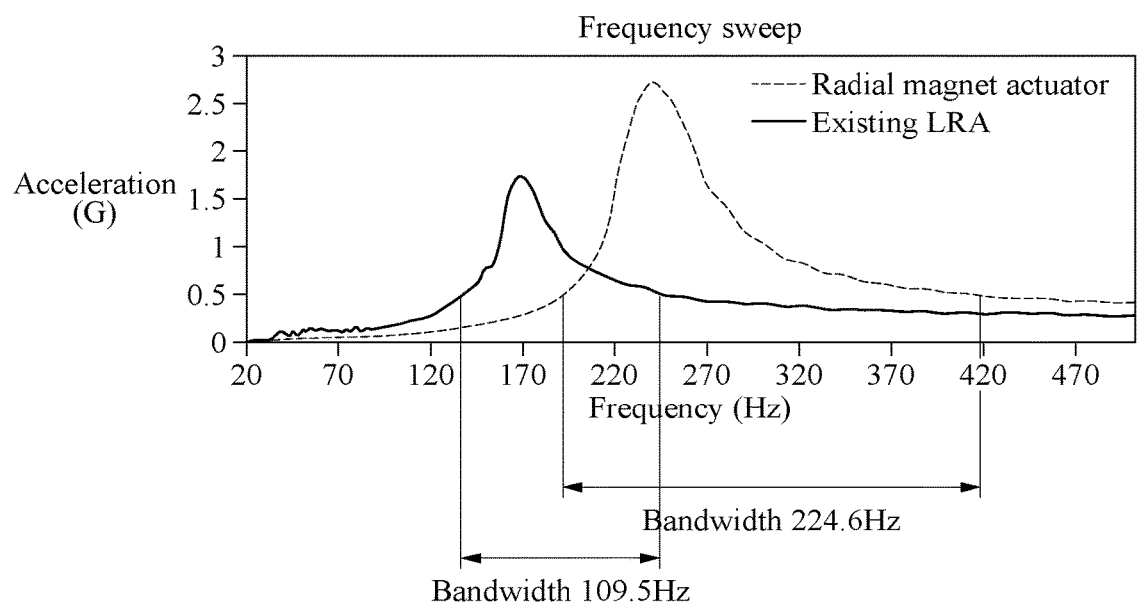
FIG. 9 is a graph illustrating vibration forces formed for respective driving frequencies of a conventional linear resonant actuator (LRA) and a radial magnet actuator according to an embodiment.

FIG. 9 is a graph illustrating vibration forces formed for respective driving frequencies of a conventional linear resonant actuator (LRA) and a radial magnet actuator according to an embodiment.

Referring to FIG. 9, the magnitudes of vibration forces G measured at the conventional LRA and the radial magnet actuator 1 according to the magnitudes of driving frequencies, when a current is applied to the conventional LRA and the radial magnet actuator 1, may be compared.

In the conventional LRA, it may be learned that the magnitude of the vibration force is greater than or equal to 0.5 G in a period between 130 Hz and 240 Hz, and thus the conventional LRA has a drive bandwidth of about 110 Hz.

In the radial magnet actuator 1, it may be learned that the magnitude of the vibration force is greater than or equal to 0.5 G in a period between about 190 Hz and 420 Hz, and thus the radial magnet actuator 1 has a drive bandwidth of about 225 Hz, which is at least twice wider than that of the conventional LRA.

Figure 10:
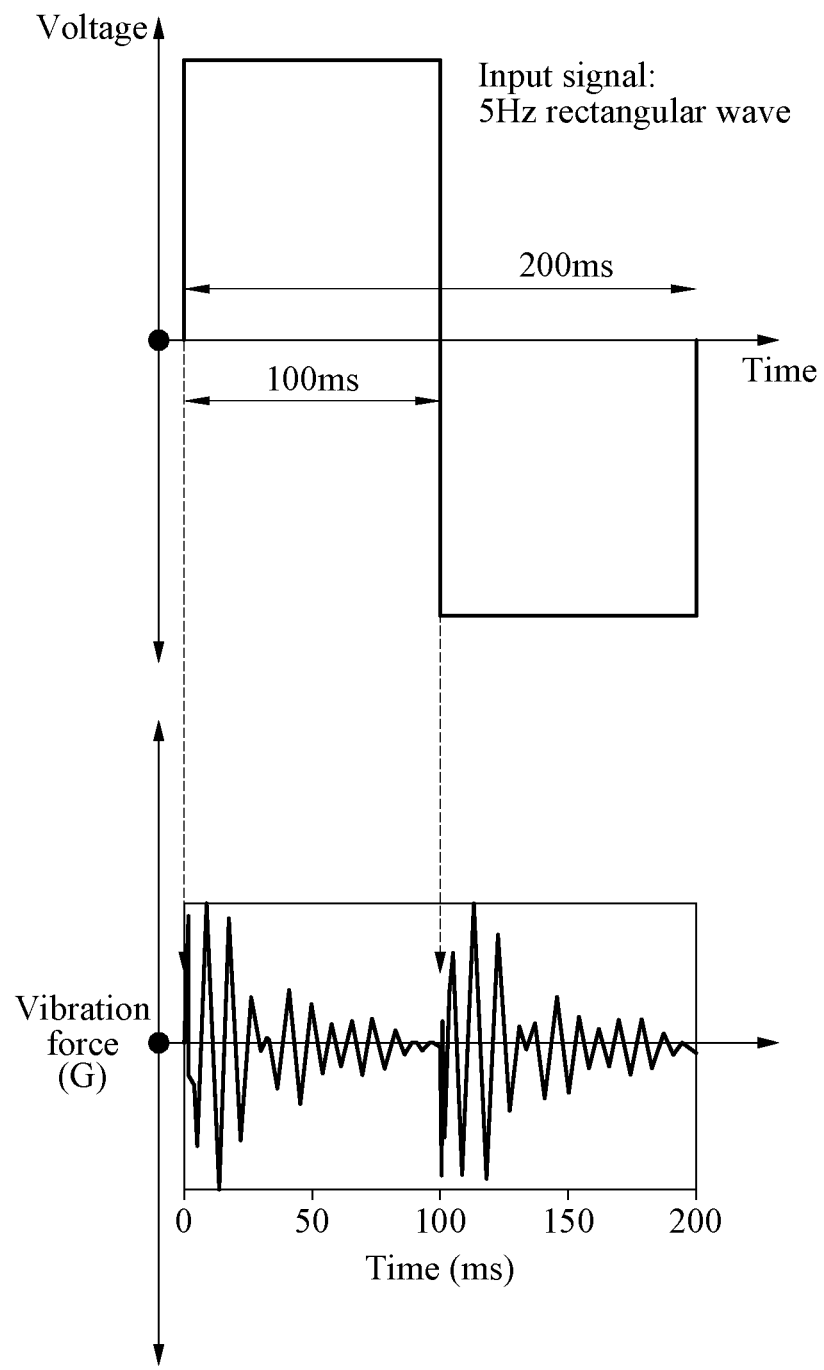
FIG. 10 is a graph illustrating an example of forming a haptic effect corresponding to tapping when a 5 Hz rectangular wave is applied to a radial magnet actuator according to an embodiment.

FIG. 10 is a graph illustrating an example of forming a haptic effect corresponding to tapping when a 5 Hz rectangular wave is applied to a radial magnet actuator according to an embodiment.

First, the first graph of FIG. 10 shows the form of a voltage when the controller 17 applies a rectangular wave with a frequency of 5 Hz to the coil part 14 for a cycle, and the second graph of FIG. 10 shows a vibration force G formed in the radial magnet actuator 1 according to the input shown in the first graph.

Referring to FIG. 10, it may be learned that a haptic response different from a general vibration is formed when a rectangular wave corresponding to an ultra-low frequency band between 1 to 20 Hz is applied to the radial magnet actuator 1. Through the haptic response, the radial magnet actuator 1 may provide a tactile sensation of "tapping" to the user. That is, FIG. 10 shows an example of driving the radial magnet actuator 1 in a "tapping mode".

Referring to the graph on the bottom of FIG. 10, the haptic response driven in the tapping mode shows that the amplitude in the waveform of the vibration force changes in each cycle over time. The amplitude decreases approximately exponentially during a half cycle, in detail, shows a great value for a short time (about 20 ms) in the beginning and rapidly decreases in the middle and second half. Through such a drastic difference in the amplitude, the user may sense a haptic effect such as intermittent tapping which is different from a general vibration.

Figure 11:
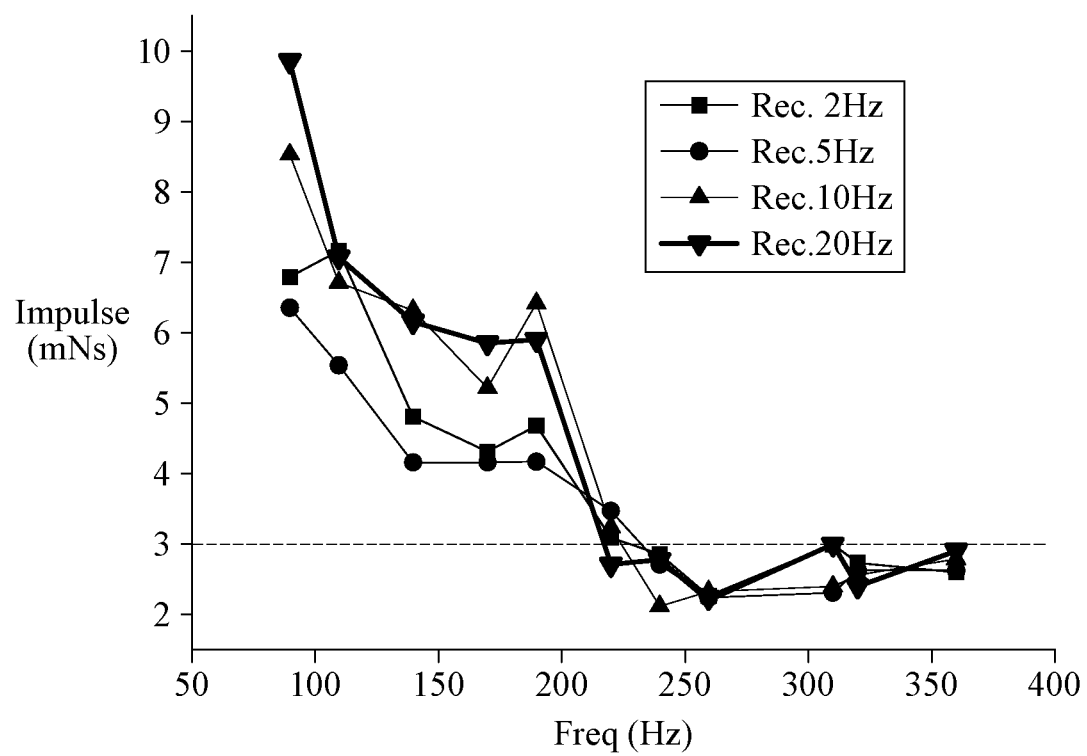
FIG. 11 is a graph illustrating impulses generated when rectangular waves of different ultra-low frequency bands are applied to a radial magnet actuator according to an embodiment.

FIG. 11 is a graph illustrating impulses generated when rectangular waves of different ultra-low frequency bands are applied to a radial magnet actuator according to an embodiment.

In detail, FIG. 11 is a graph showing impulses obtained by integrating, within a 50-ms period, vibration forces measured during the 50-ms period after applying rectangular waves corresponding to 2 Hz, 5 Hz, 10 Hz and 20 Hz to tactile actuators having various resonant frequencies between 80 Hz to 360 Hz.

The impulses may be obtained by integrating the vibration forces in the unit of 50 ms using Equation 1.

$$(\text{Impulse}) = \int_{t_0}^{t_0+50\,ms} F dt \quad [\text{Equation 1}]$$

(t_0 denotes the time at the instant of input of the waveform)

According to "Robotic Tactile Sensing Technologies and System, Springer Science & Business Media, (Jul. 29, 2012)", it was verified that the minimum time required for a human to distinguish two stimuli with fingertips is 30 to 50 ms, and that an impulse of 3 mNs or more is required in a period of 0 to 50 ms for a human to recognize tapping with fingers as a result of the measurement subject to adults in their 20 s to 40 s.

Figure 12:
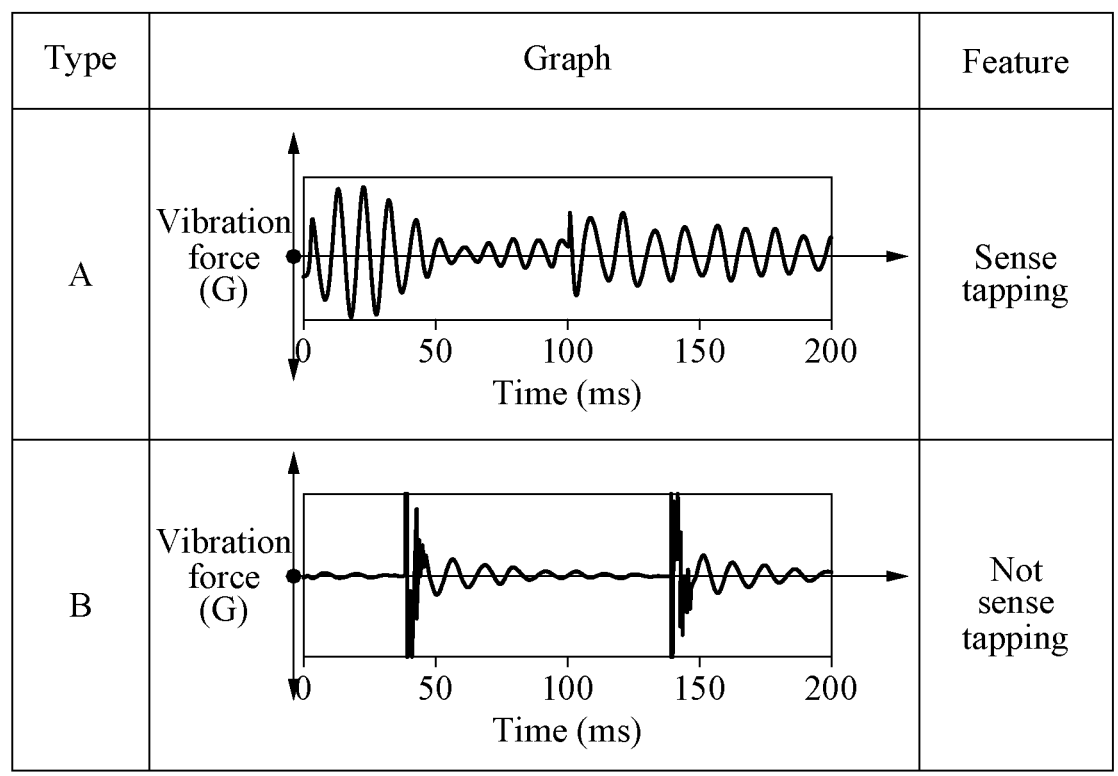
FIG. 12 illustrates graphs of vibration forces formed in Case A where a 5 Hz rectangular wave is applied according to an embodiment and in Case B where a sine wave is applied.

To acquire a desirable tapping effect from the radial magnet actuator 1, a rectangular wave less than or equal to 20 Hz, which is the minimum frequency limit to provide a tactile sensation corresponding to a general vibration, needs to be applied as shown in FIG. 12, and a cumulative impulse during a 50-ms period, which is the minimum time required for an average person to distinguish two stimuli, should be greater than or equal to 3 mNs as confirmed above.

FIG. 12 illustrates graphs of vibration forces formed in Case A where a 5 Hz rectangular wave is applied according to an embodiment and in Case B where a sine wave is applied.

Referring to FIG. 12, if there is a period (0 to 50 ms) in which the sum of impulses in the 50-ms period exceeds 3 mNs as in Type A, a user may sense a tactile sensation of tapping.

Conversely, as a case of a haptic response with an extremely high attenuation rate similar to an impulse, if there is no period in which the sum of impulses in the 50-ms period exceeds 3 mNs as in Type B, the user may not sense a tactile sensation of tapping.

Figure 13:
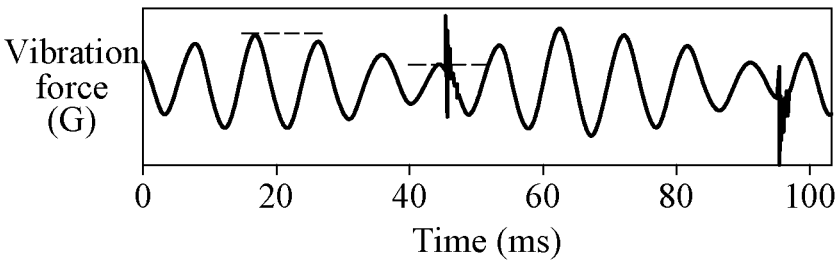
FIG. 13 illustrates graphs of vibration forces formed when rectangular waves of ultra-low frequency bands are applied according to an embodiment.

FIG. 13 illustrates graphs of vibration forces formed when rectangular waves of ultra-low frequency bands are applied according to an embodiment.

In detail, FIG. 13 represents Type A, Type B, and Type C of the graphs of vibration forces measured when rectangular waves of 10 Hz, 15 Hz, and 20 Hz are input into the radial magnet actuator 1.

Referring to FIG. 13, in Type A and Type B, the amplitude of the vibration force, that is, the height of the peak, changes over time, as indicated with broken lines. For example, a difference in height of the peak of the amplitude may be greater than or equal to 0.1 G. Further, it may be learned that the minimum interval in which the difference in height of the peak of the amplitude is greater than or equal to 0.1 G is formed to be greater than or equal to the minimum time required for a human to distinguish two stimuli with fingertips, for example, 30 ms. In Type A and Type B, a user may feel a new tactile sensation different from general vibration that the user may feel in Type C, which will be described later, that is, a tactile sensation corresponding to tapping.

Conversely, in Type C, it may be learned that the interval of the cycle is formed to be short within the minimum time required for a human to distinguish two stimuli with fingertips, for example, 30 ms, and that the difference in amplitude is less than 0.1 G and thus is not great, as indicated with a broken line. In this example, the user may sense a general vibration rather than tapping.

Thus, to operate the radial magnet actuator 1 in a tapping mode, a rectangular wave of less than 20 Hz may be applied. That is, even when a rectangular wave is applied, the user may sense a general vibration rather than tapping since the rectangular wave shows a waveform the same as that of a sine wave if the frequency of the rectangular wave exceeds 20 Hz.

Consequently, in the tapping mode, the controller 15 may form a haptic effect corresponding to tapping by applying an alternating current of a rectangular waveform of less than 20 Hz to the coil part 14.

Figure 14:
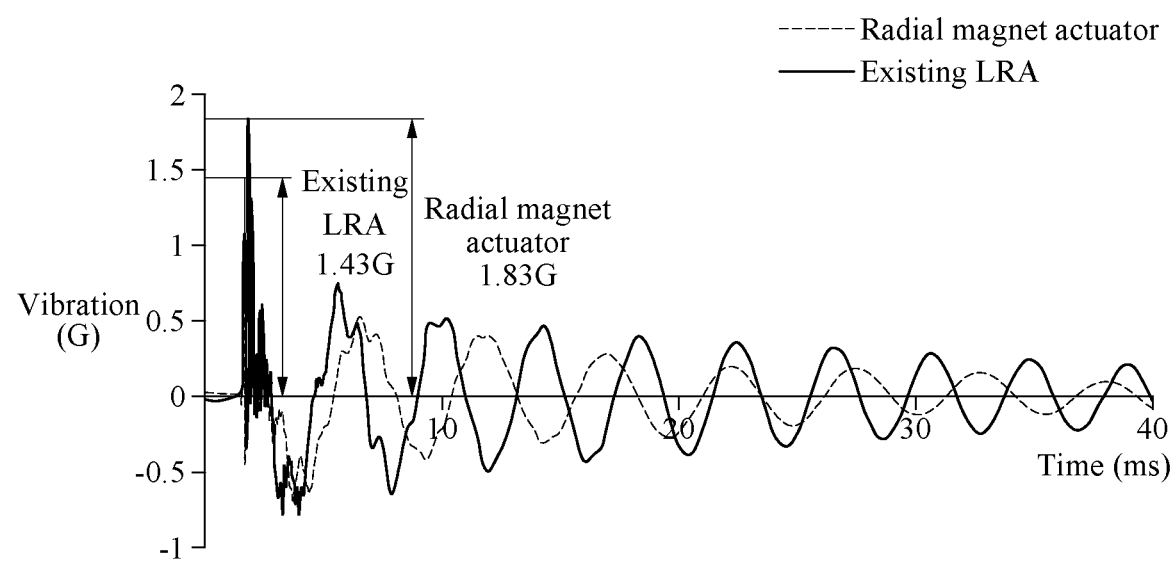
FIG. 14 is a graph illustrating changes in vibration force formed over time when a rectangular wave of an ultra-low frequency band is applied to a conventional linear resonant actuator and a radial magnet actuator according to an embodiment.

FIG. 14 is a graph illustrating changes in vibration force formed over time when a rectangular wave of an ultra-low frequency band is applied to a conventional linear resonant actuator and a radial magnet actuator according to an embodiment.

Referring to FIG. 14, it may be learned that a vibration force of up to about 1.43 G is measured when a rectangular wave of a low frequency band is applied to the conventional LRA, whereas a higher vibration force of about 1.83 G is measured when a rectangular wave of a low frequency band is applied to the radial magnet actuator 1.

Therefore, it may be learned that the radial magnet actuator 1 may transfer an explicit haptic effect even when driven in a low frequency band.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A radial magnet actuator, comprising:
  a housing having an inner space;
  a moving body including a mass body provided to be relatively movable in the inner space, and a hollow radial magnet provided in the mass body;
  an elastic member configured to connect the housing and the moving body;
  a coil part provided in the inner space and at least a part of which is inserted into the hollow of the radial magnet; and
  a controller configured to apply an alternating current to the coil part,
  wherein the radial magnet is magnetized in a radial direction, and an inner side of the radial magnet has a polarity of N pole or S pole, and an outer side of the radial magnet has a polarity opposite to the inner side of the radial magnet,
  wherein the coil part receives an alternating current from the controller to generate a magnetic field whose polarity alternately changes, and
  wherein a magnitude of a vibration force generated between a first driving frequency and a second driving frequency which is greater than the first driving force is measured to be 0.5G or more, and a bandwidth, which is a difference between the first driving frequency and the second driving frequency, is greater than 200 Hz, wherein the second driving frequency is greater than 400 Hz.

2. The radial magnet actuator of claim 1, wherein when the controller applies an alternating current of a frequency band between 1 Hz to 20 Hz to the coil part, a cumulative impulse produced by the moving body within a unit interval of 50 ms is 3 mNs or greater, such that a haptic effect corresponding to tapping is produced.

3. The radial magnet actuator of claim 1, wherein a direction in which magnetic flux enters the radial magnet or magnetic flux exits from the radial magnet is perpendicular to a direction in which the moving body moves.

4. The radial magnet actuator of claim 1, wherein the mass body comprises:
   an accommodation space recessed from the top thereof along a radial trajectory of a radius set from the central axis thereof,
   wherein the radial magnet is inserted into the accommodation space, and a lower side of the coil part is inserted between an inner circumferential surface of the hollow of the radial magnet and an inner circumferential surface of the accommodation space.

5. The radial magnet actuator of claim 4, wherein the housing is in the shape of a cylinder with a diameter of 6 mm to 12 mm.

6. The radial magnet actuator of claim 1, wherein in a state in which a current is not applied to the coil part, the center of the coil part is at an upper position by a set interval than the center of the radial magnet based on a vertical direction.

7. The radial magnet actuator of claim 6,
   wherein the mass body further comprises a depression, and
   wherein a central portion of the inner side of the accommodation space is recessed from above to form the depression.

* * * * *